(12) United States Patent
Brite et al.

(10) Patent No.: US 6,325,304 B1
(45) Date of Patent: Dec. 4, 2001

(54) TRIGGER-ACTIVATED INSECTICIDE APPLICATOR WITH EXTENDED NOZZLE

(76) Inventors: Alan D. Brite; Terry Brite, both of P.O. Box 50610, Santa Barbara, CA (US) 93150

(*) Notice: Subject to any disclaimer, the term of this patent is extended or adjusted under 35 U.S.C. 154(b) by 0 days.

(21) Appl. No.: 09/512,932

(22) Filed: Feb. 25, 2000

Related U.S. Application Data

(60) Continuation-in-part of application No. 09/456,023, filed on Dec. 3, 1999, which is a division of application No. 08/994,056, filed on Dec. 19, 1997, now abandoned.

(51) Int. Cl.[7] .............................. A01M 7/00; B05B 9/043
(52) U.S. Cl. ............................. 239/333; 43/132.1; 43/900
(58) Field of Search ................................... 239/333, 337, 239/390, 391, 436, 587.1, 588, 271; 222/526, 527, 533; 43/124, 132.1, 900; 47/1.7, 48.5, 57.5, 58.1; 111/7.1, 7.2, 127

(56) References Cited

U.S. PATENT DOCUMENTS 2,046,089   6/1936   Rebhahn .............................. 221/104

(List continued on next page.)

OTHER PUBLICATIONS

Morris, P I Byrne, A., "The Effect of DDAC on The Penetration of Borates Into Western Hemlock"; Forest Products Journal (1997), vol. 47, No. 4, pp. 71–73.

(List continued on next page.)

*Primary Examiner*—Lesley D. Morris
(74) *Attorney, Agent, or Firm*—Lyon & Lyon LLP

(57) ABSTRACT

A liquid insecticide applicator in the form of a trigger pump having a detachable, semirigid, tubular extended nozzle press fit into a recess within a nipple along the discharge end of the pump assembly is provided. When the extended nozzle is engaged to the pump assembly, the applicator is suitable for applying or injecting insecticides such as solutions of containing disodium octaborate tetrahydrate (D.O.T.) into holes or wall voids. When the extended nozzle is disengaged from the pump assembly, the applicator can deliver contents in a spray, suitable for treating larger surfaces, such as large areas of exposed wood. Preferably, the liquid insecticide solution used with the applicator is a 5% to 20% water solution of a DOT mixture comprising disodium octaborate tetrahydrate, colored pigment, and a bittering agent of either sucrose octa-acetate or denatonium benzoate. The applicator may alternatively be used to deliver liquid fertilizer to a plant by injecting the fertilizer below the soil surface, closer to the root structure of the plant.

8 Claims, 2 Drawing Sheets

U.S. PATENT DOCUMENTS

| | | | |
|---|---|---|---|
| 2,723,056 | | 11/1955 | Smith .................................. 222/396 |
| 2,968,441 | | 1/1961 | Holcomb ............................. 239/337 |
| 3,058,632 | | 10/1962 | Stremmel ............................ 222/567 |
| 3,116,856 | | 1/1964 | Prussin et al. ...................... 222/394 |
| 4,299,258 | | 11/1981 | Brite ........................................ 144/1 |
| 4,438,090 | | 3/1984 | Brite ..................................... 424/7.1 |
| 4,461,758 | | 7/1984 | Brite ..................................... 424/10 |
| 4,805,814 | | 2/1989 | Allen, Sr. ............................. 222/538 |
| 4,817,329 | | 4/1989 | Forbes .................................. 43/124 |
| 4,873,084 | | 10/1989 | Salloy .................................. 424/656 |
| 4,958,456 | | 9/1990 | Chaudoin et al. .................... 43/124 |
| 5,004,128 | | 4/1991 | Richichi et al. ..................... 222/527 |
| 5,006,562 | | 4/1991 | Steltenkamp ........................ 514/625 |
| 5,090,602 | | 2/1992 | Link .................................... 222/527 |
| 5,147,075 | | 9/1992 | Regan ............................. 222/402.15 |
| 5,194,232 | | 3/1993 | Savoy ............................... 423/305.5 |
| 5,224,315 | | 7/1993 | Winter, IV ......................... 52/309.8 |
| 5,249,716 | | 10/1993 | O'Sullivan .......................... 282/568 |
| 5,251,820 | * | 10/1993 | Ho .................................. 239/588 X |
| 5,270,108 | | 12/1993 | Savoy ............................... 428/304.4 |
| 5,279,256 | * | 1/1994 | Brite .................................. 43/900 X |
| 5,309,669 | * | 5/1994 | Jackson ............................. 43/124 |
| 5,419,077 | * | 5/1995 | Tombarelli ......................... 43/132.1 |
| 5,564,222 | | 10/1996 | Brody ................................. 43/124 |
| 5,592,774 | | 1/1997 | Galyon ............................... 43/124 |
| 5,612,094 | | 3/1997 | Schubert et al. .................... 427/397 |
| 5,637,298 | | 6/1997 | Stowell ............................... 424/84 |
| 5,645,198 | * | 7/1997 | Stern et al. ...................... 239/391 X |
| 5,667,816 | | 9/1997 | Moss ................................... 424/659 |
| 5,833,675 | | 11/1998 | Garcia ................................ 604/310 |
| 5,988,530 | * | 11/1999 | Rockefeller ..................... 239/391 X |

OTHER PUBLICATIONS

Morrell, II; Freilag, C.M.; Effect of Wood Moisture Content on Diffusion of Boron–Based Biocides Through Douglas Fir and Western Hemlock Lumber; Forest Products Journal (1995), vol. 45, No. 3, pp. 51–55.

Handout by U.S. Borax, Inc., "Tim–bor® Professional wood Perservative/Insect Control"; ©1997 (2 pages).

U.S. Borax, Inc., Tim–bor® Professional Material Safety Data Sheet, Date of Issue Dec. 1997 (4 pages).

U.S. Borax, Inc., "Tim–bor® Professional Wood Preservative/Insect Control Service Bulletin", ©1998 (12 pages).

Handout by Makiki Electronics, "Biodegradable Term–Out Kills Termites, Roaches and Ants".

Chapin Professional Equipment Catalog, "The hard working sprayer for the hard working professional".

Handout: MasterLine® Sprayer Parts, Crack & Crevice Tool, MasterLine Part #672449, Chapin Part #610424.

Handout by the afa® Corporation, "Trigger Sprayer Specialists–Worldwide", "5910 Trigger Sprayer Economical, Reusable, Adjustable".

Handout by The afa® Corporation "Trigger Sprayer Specialists–Worldwide", "7210 Trigger Sprayer Chemically Resistant".

Handout by The afa® Corporation "Trigger Sprayer Specialists–Worldwide", "7590 Trigger Foamer/Sprayer Economical, Consumer/Shipper".

Handout by The afa® Corporation "Trigger Sprayer Specialists–Worldwide", "8710 AT Trigger Sprayer, Fully Adjustable Consumer/Shipper".

Handout by Indesco International, Inc., "Serlo 8N".

Handout by H. D. Hudson Manufacturing Company, "The Compression Sprayer".

Handout by H. D. Hudson Manufacturing Company, "Getting Started on a Spraying Program".

Handout by H. D. Hudson Manufacturing Company, "hudson® Innovative Source Market Force".

* cited by examiner

TRIGGER-ACTIVATED INSECTICIDE APPLICATOR WITH EXTENDED NOZZLE

This is a continuation-in-part of U.S. patent application Ser. No. 09/456,023, filed Dec. 3, 1999 and currently pending, which is a divisional application of U.S. patent application Ser. No. 08/994,056, filed Dec. 19, 1997, and now abandoned both specifications of which are incorporated herein by reference.

FIELD OF THE INVENTION

The present invention pertains generally to the field of insecticide applicators, and more particularly to a non-pressurized, handheld trigger pump having an extended nozzle to permit insecticide to be drawn from a reservoir and injected into holes or voids, or applied to areas where access is limited.

BACKGROUND OF THE INVENTION

Insecticides are generally used either to prevent future infestation by harmful insects, to eliminate present infestation by killing such insects, or both. It is desirable to apply insecticides directly to the area of infestation. This can be difficult, however, when access to the area of infestation is limited, for example, in cases of infestation by wood-destroying insects such as termites, carpenter ants, or beetles. These insects may enter a wood member and destroy the member from the inside out, or may attack a wood member surrounded by other materials such as within a wall. Different technologies have been developed to deliver liquid insecticides into hard-to-access areas; however, each of these conventional technologies suffer from limitations that restrict their utility.

One conventional apparatus for applying insecticide is the aerosol sprayer. A typical example consists of a pressurized metal canister and a finger-activated release valve that ejects the contents through an orifice. A modified aerosol sprayer, having a highly flexible tube with a rigid needle end for directing contents, has also been developed by Makiki Electronics, Hauula, Hi. By the very nature of aerosol canisters, however, they may not be opened and refilled. Therefore, such canisters must be discarded when their contents are depleted. These apparatuses also present the typical dangers associated with all pressurized canisters: they must be kept away from high heat, may contain propellants that are flammable and/or pollute the air, and may spray contents uncontrollably if punctured. Moreover, since conventional aerosol cans are metallic and uninsulated, the cans and the contents ejected therefore need to be kept a safe distance away from electric wires, junction boxes, or outlets to avoid the possibility of the user receiving an electric shock.

Another ubiquitous apparatus for applying insecticide is the garden tank sprayer. A typical example consists of: a reservoir that may be filled with an insecticide, means such as a hand pump or compressor coupling for pressurizing the fluid contents of the reservoir, and a hose from the reservoir to a discharge valve and nozzle. Operation of a typical garden tank sprayer requires the user to fill the reservoir with fluid and then pressurize the reservoir via a hand pump or external compressor, before the fluid contents may be transported through the connecting hose and discharged through the discharge nozzle by selectively activating and deactivating the discharge valve. A typical garden tank sprayer reservoir holds a gallon or more of liquid. Since most termite infestation is localized to a particular area, using a garden tank sprayer for spottreatment of localized areas is often overkill, as such an applicator is may be tiresome to wield for long periods in hard-to-access areas. Typically, a garden tank sprayer reservoir is carried with one hand, while the discharge nozzle is manipulated with the other hand. That the garden tank sprayer requires two hands to operate limits its utility for treating confined or hard-to-reach spaces where it would be desirable for the user to have one hand free for positioning or bracing himself. Like aerosol cans, garden tank sprayers also present certain hazards inherent to pressurized liquid containers.

In light of the limitations of prior art insecticide delivery apparatuses, it would be desirable to provide a refillable handheld insecticide delivery apparatus whereby the insecticide would be delivered to areas where access is limited, such as recesses accessible only through small holes. It would also be desirable for this apparatus to be capable of also delivering contents in a spray, suitable for treating larger surfaces, such as large areas of exposed wood, when needed. It would further be desirable for this apparatus to be capable of being operated with a single hand. Simultaneous with the feature of being operable with a single hand, it would also be desirable for this apparatus to be capable of delivering in various directions without requiring the entire apparatus to be tilted, since tilting the apparatus may hinder the delivery of insecticide.

Shifting from the insecticide delivery apparatus to the insecticide itself, it is desirable from an efficiency standpoint to provide a permanent, non-polluting, non-carcinogenic, and non-flammable insecticide that can be used in the home. Conventional permanent, or nonbiodegradable, insecticides that would satisfy these criteria have been found to be carcinogenic products. Their use has hence been banned. It would also be desirable for an insecticide to be inorganic, to avoid allergic responses that commonly result from exposure to organic chemicals.

It would further be advantageous to provide an insecticide for wood-infesting insects that also eliminates various types of fungi and mold that contribute to wood rot. Again, since it is desirable to deliver insecticide directly to the affected area and access to such areas may be limited by painted or sealed wood, the need for this insecticide parallels the need for an improved insecticide delivery apparatus. In areas where residue may be accessible to humans or domestic animals, however, it would also be desirable to provide an insecticide that includes various built-in safety measures to deter consumption. Thus, there is a need for a permanent yet noncarcinogenic insecticide that targets insects, fungi, and mold, and deters consumption by humans or domestic animals.

It would be further desirable to provide an apparatus that may deliver fertilizer to a plant in an efficient manner that places the fertilizer close to the root structure of the plant to facilitate absorption.

SUMMARY OF THE INVENTION

The present invention is directed to a liquid insecticide applicator in the form of a refillable trigger pump having a semirigid tubular extended nozzle, suitable for applying or injecting insecticides such as solutions of containing disodium octaborate tetrahydrate into holes, joints, cracks, wall voids, or wood surfaces. The insecticide used is preferably permanent, inorganic, yet noncarcinogenic, odorless, and non-flammable, and targets insects, fungi, and mold while deterring consumption by humans or domestic animals. The liquid applicator is unpressurized to avoid the dangers and limitations of working with pressurized reservoirs. Accordingly, one aspect of the invention provides a hand-held trigger pump and reservoir, the pump having a semirigid, detachable tubular extended nozzle to deliver an insecticide into holes or wall voids. This extended nozzle is advantageously press-fit into a recess along the discharge end of the pump assembly, the size of the nozzle preferably being about 0.085 inch or less in outside diameter. This small size is desirable to permit insertion into 3/32 inch or larger holes such as may be drilled into contaminated structures and wall voids, and may be easily patched following application of the insecticide.

In a second aspect of the invention, the insecticide mixture delivered by the trigger pump insecticide applicator is advantageously a water solution containing solute in an amount between 5 and 20 weight percent, said solute comprising disodium octaborate tetrahydrate in an amount 95% by weight, more preferably 97% by weight, pigment, and an ingredient selected from the group consisting of sucrose octa-acetate and denatonium benzoate.

In a third aspect of the invention, the trigger pump applicator may be used to deliver a liquid fertilizer to a plant by injecting the fertilizer below the soil surface, closer to the root structure of the plant.

DETAILED DESCRIPTION OF THE PREFERRED EMBODIMENTS

In a particular embodiment, a liquid insecticide applicator includes a trigger pump having a semirigid tubular extended nozzle, suitable for drawing insecticides such as solutions containing disodium octaborate tetrahydrate (D.O.T) from a reservoir and applying or injecting it into holes, cracks, or wall voids. Though the applicator can deliver a variety of different insecticides to many different hard-to-access areas, the applicator is well suited for delivering insecticides to areas affected by wood-infesting insects such as termites, carpenter ants, and beetles, along with fungi and mold. In such an application, the insecticide used is preferably a water solution including a combination of either sucrose octa-acetate (S.O.A.) or denatonium benzoate (commonly available under the name Bitrex™, a trademarked product comprising denatonium benzoate) and a nonwhite pigment with a mixture of D.O.T. Preferably, this insecticide is a water solution containing solute in an amount between 5 and 20 weight percent, said solute comprising disodium octaborate tetrahydrate in an amount 95% by weight, more preferably 97% by weight, pigment, and an ingredient selected from the group consisting of S.O.A. and denatonium benzoate. Preferably, the pigment and S.O.A. or denatonium benzoate combined comprise less than 1% by weight of the insecticide mixture before dissolution in water.

The pigment, which is preferably nonwhite, and more preferably green, red, or blue in color, provides a visible cue of the presence of the insecticide. The pigment is preferably liquid to promote easy handling, such as within a disposable pouch. Vegetable dye may be advantageously used. Powdered pigment, however, may also be used. As for the other additive, both S.O.A. and denatonium benzoate have been found to serve as bittering agents without diminishing the effectiveness of the insecticide. Thus, while S.O.A. and denatonium benzoate exhibit a taste that is repulsive to humans or domestic animals, thereby preventing inadvertent inhalation or consumption of a harm-causing quantity of insecticide, neither substance repulses insects at very low concentrations.

Figure 2A:
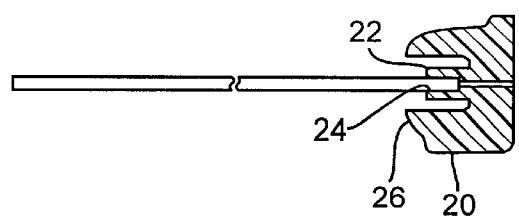
FIG. 2a is a cross-sectional schematic view of a nipple along the discharge end of the liquid insecticide applicator depicted in FIG. 1, with the extended nozzle press-fit into a recess defined by the nipple.
Figure 2B:
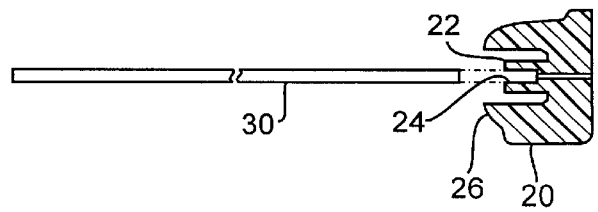
FIG. 2b is a cross-sectional schematic view of the nipple depicted in FIG. 1, with the extended nozzle removed from the recess at the distal end of the nipple.
Figure 1:
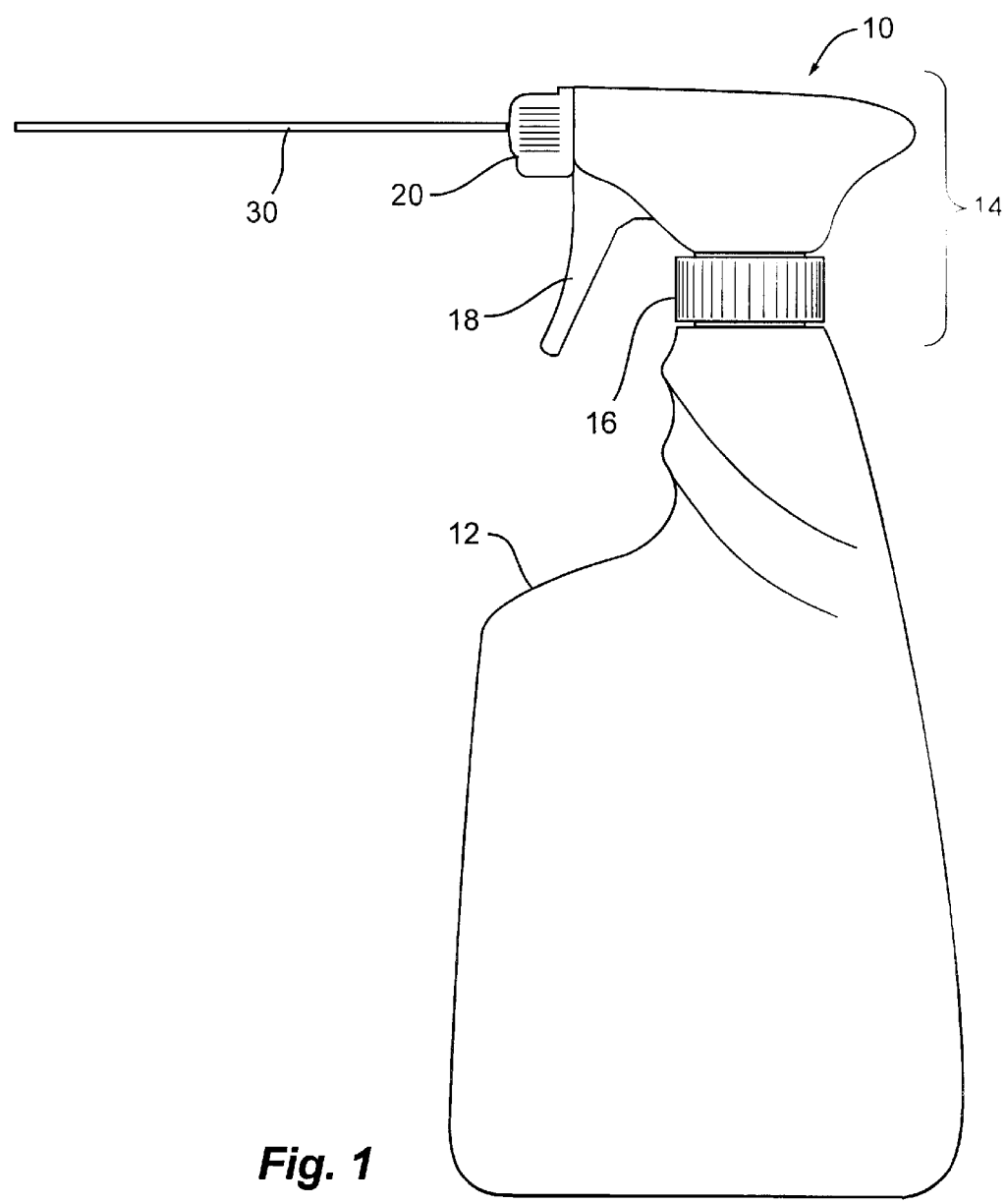
FIG. 1 is a side view of a liquid insecticide applicator according to one embodiment of the present invention.

FIG. 1 illustrates a liquid insecticide applicator 10 according to one embodiment of the present invention. A pump assembly 14 is removably attached to a reservoir 12 via a threaded collar 16. The pump assembly 14 is of suitable size to be wielded with one hand. The reservoir 12 may be detached from the pump assembly 14 to be filled with insecticide. The reservoir 12 preferably connects directly to the pump assembly 14, the reservoir preferably containing approximately 12 to 18 ounces of insecticide to permit the applicator 10 to be wielded with one hand. Alternatively, however, the pump assembly 14 may include an extended suction tube having a threaded collar, such as, for example, the 36 inch suction tube of the Model 8710HNL Trigger Sprayer (not shown) available from the AFA Corporation, to permit the reservoir 12 to connect to a larger, remote reservoir of one gallon or larger. The pump assembly 14 of the present invention has a rotatable nipple 20 that also functions as a valve, such as is known in the art, to selectively prevent flow through the nipple 20. The nipple 20 has a hollow protrusion 22 defining a recess 24 (as illustrated in FIGS. 2a and 2b) for accepting insertion of a tubular extended nozzle 30. The hollow protrusion 22 is preferably surrounded by a shroud 26 that serves to protect the protrusion 22. The hollow protrusion 22 and shroud 26 are preferably integrally molded with the nipple 20. Bursts of liquid insecticide stored in the reservoir 12 can be discharged through the extended nozzle 30 via the pump assembly 14 and nipple 20 by actuating the trigger 18. When the tubular extended nozzle 30 is not inserted in the nipple 20, the applicator 10 can be used to deliver contents in a spray, suitable for treating larger surfaces, such as large areas of exposed wood. The pump assembly 14 is a typical pump assembly known in the art of liquid delivery, except for the modifications to the nipple 20, including modifications to accept insertion of the extended nozzle 30.

The extended nozzle 30 preferably consists of a semirigid hollow tube made of plastic. Alternatively, however, the hollow tube may be made of a thin and suitably pliable metal, such as extruded aluminum, brass, or stainless steel. If a metal rather than plastic tube is used, the metal tube is preferably aluminum for its pliability. "Semirigid" in this context refers to the ability of the nozzle 30 to remain substantially rigid and linear when supported from only one end, yet retain an angled shape up to approximately 45 degrees or more and pass liquid following forcible bending by the user, such as with the user's free hand. This semirigidity allows the user to apply insecticide with only one hand, by simply grasping the applicator 10 and activating the trigger 18, into specific hard-to-reach areas, such as cracks or individual holes left behind by termites or by drilling into contaminated wood or wall voids. The semirigid extended nozzle 30 may have some flexibility—to the extent that the user may grasp and bend the nozzle 30 into an angled position so as to direct insecticide around an obstruction, for instance—but not to the extent that activation of the trigger will cause the discharging insecticide to oscillate. Such oscillation would cause the insecticide to be applied in an uncontrolled direction, thus wasting insecticide and possibly requiring clean-up of any unintended liquid application. The ability of the extended nozzle 30 to retain an angled shapes up to approximately 45 degrees or more and still pass liquid is desirable, for instance, to permit the user to apply liquid insecticide into holes or voids located overhead without tilting the applicator 10 to the extent that suction of liquid within the reservoir 12 may be interrupted.

The extended nozzle 30 to be used with the nipple 20 is preferably approximately 6 inches in length, and preferably has an outside diameter of approximately 0.085 inch or less. These dimensions are usually suitable for applying insecticide directly to affected areas in the case of wood-infesting insects such as termites, carpenter ants, and beetles. The narrow 0.085 inch width permits the extended nozzle 30 to be inserted into holes, for instance, created by termites or drilled by the user, while the extended length of approximately six inches allows the semi-rigid nozzle 30 to be directed past or around obstructions in order to apply insecticide directly to areas targeted by the user.

FIGS. 2a and 2b illustrate cross-sectional schematic views of the nipple 20 of the liquid insecticide applicator 10 illustrated in FIG. 1a. The cross-sectional schematic view provides detail of the press-fit connection between the extended nozzle 30 and the hollow protrusion 22 integral to the nipple 20. The hollow protrusion 22 defines a recess 24 within which the extended nozzle 30 may be removably connected via a press-fit connection. The removable connection between the nipple 20 and the extended nozzle 30 allows the applicator 10 to quickly convert between delivering contents as a spray, when the extended nozzle 30 is not connected, to acting as an injector, when the extended nozzle 30 is connected.

In FIG. 2a, the extended nozzle 30 is illustrated as press-fit into the recess 24 contained in the hollow protrusion 22 of the nipple 20. The press-fit connection should preferably be tight enough to retain the extended nozzle 30 in position and prevent outward leakage adjacent to the recess 24. FIG. 2b illustrates the extended nozzle 30 separated from the nipple 20, such separation as would be appropriate when using the applicator 10 as a sprayer.

Figure 3A:
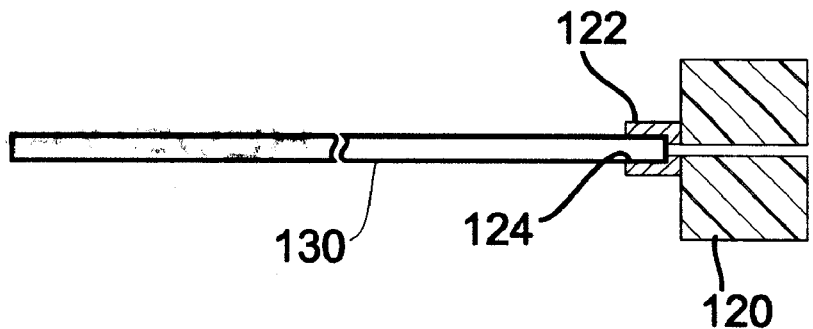
FIG. 3a is a cross- sectional schematic view of a first alternative nipple for use along the discharge end of a liquid insecticide applicator according to the present invention, with an extended nozzle press-fit into a recess defined by the nipple.
Figure 3B:
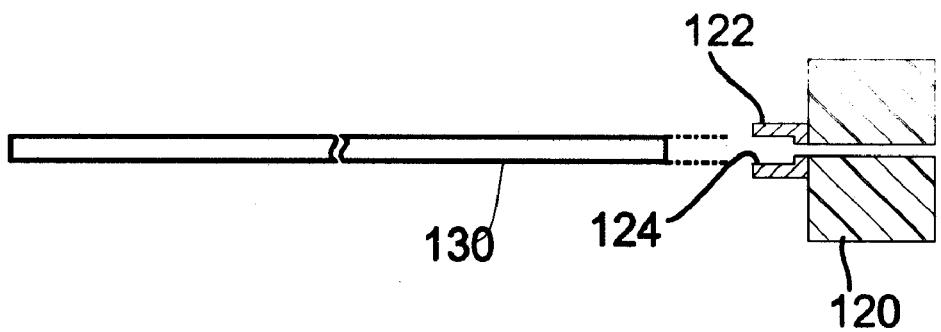
FIG. 3b is a cross-sectional schematic view of the first alternative nipple depicted in FIG. 3a, with the extended nozzle removed from the recess at the distal end of the nipple.

FIGS. 3a and 3b illustrate cross-sectional schematic views of a first alternative nipple 120 for use with a liquid insecticide applicator of the present invention. The cross-sectional schematic view provides detail of the press-fit connection between the extended nozzle 130 and the hollow protrusion 122 integral to the nipple 120. The hollow protrusion 122 defines a recess 124 within which the extended nozzle 130 may be removably connected via a press-fit connection. The removable connection between the nipple 120 and the extended nozzle 130 allows an applicator to which the nipple 120 is connected to quickly convert between delivering contents as a spray, when the extended nozzle 130 is not connected, to acting as an injector, when the extended nozzle 30 is connected.

In FIG. 3a, the extended nozzle 130 is illustrated as press-fit into the recess 124 contained in the hollow protrusion 122 of the nipple 120. The press-fit connection should preferably be tight enough to retain the extended nozzle 130 in position and prevent outward leakage adjacent to the recess 124. FIG. 3b illustrates the extended nozzle 130 separated from the nipple 120, such separation as would be appropriate when using an applicator of the present invention incorporating the nipple 120 as a sprayer.

An applicator 10 according to the present invention is suitable for applying D.O.T.-based insecticides that kill both wood-destroying insects such as, e.g., termites, beetles, and carpenter ants, and fungi and mold that cause wood rot. As discussed previously, a preferred insecticide is a water solution containing solute in an amount between 5 and 20 weight percent, said solute comprising disodium octaborate tetrahydrate in an amount 95% by weight, more preferably 97% by weight, pigment, and an ingredient selected from the group consisting of S.O.A. and denatonium benzoate. Such insecticide can advantageously be used for, e.g., interior and exterior lumber, plywood, logs, and wood-form composite structural components. The insecticide can be used for infested wood, as a preventive treatment for wood in existing structures, and for pretreatment during construction. The insecticide is mixed with water to form a solution that continues to penetrate deep into wood and does not break down, giving long-lasting protection.

In a specific embodiment, the insecticide solution may be advantageously made in quantity by filling a one-gallon container such as, e.g., a bucket with about 80% water, adding approximately one pound of the insecticide powder while stirring, and then adding water to make roughly one gallon of solution. The solution should then be stirred until it is fully dissolved, i.e., for about five minutes. Warm water should be used for optimum efficiency. If used to treat bare wood surfaces in bulk, the ensuing gallon of solution should cover approximately two hundred square feet of surface area. If used to treat areas where access is limited, such as holes, cracks, or Lo wall voids, then the solution (or part of it) should be transferred into an applicator 10 as illustrated in FIGS. 1, 2a, and 2b. The solution can be stored indefinitely in a sealed plastic container for future use. Prior to use, the solution should preferably be brought to room temperature.

The preferred insecticide solution is may be applied to unobstructed surfaces with either a paint brush or a conventional trigger pump. For decks, fences, logs, and new construction, a garden tank sprayer may be advantageously used. But when applying insecticide to small holes, cracks, or wall voids, the applicator 10 illustrated in FIGS. 1, 2a, and 2b may be used to best advantage.

When the insecticide solution is to be applied to a wood surface, the wood surface should be dried before treating. The solution should then be applied until the unsealed wood surface is thoroughly wet. A second application should be made between one and twenty-fours later. If the wood surface is sealed, it should first be sanded and/or holes should be drilled and the solution should preferably be injected into a wall void using an applicator 10 illustrated in FIGS. 1, 2a, and 2b. Such holes should advantageously measure not smaller than 3/32 inch in diameter. After application, any residue can be easily removed with hot water. The wood should be allowed to dry completely (e.g., for at least forty-eight hours after application of the insecticide solution) before paint, varnish, or waterproofing seal are applied.

In the event infested wood has become unsound, it should be removed, and two applications as described above should be made to the surrounding area and to all sides of the new wood before the new wood is installed. For pretreatment during construction, the insecticide solution may advantageously be applied to all accessible surfaces of bare wood, plywood, and wood composite until such surfaces are thoroughly wet. A second application should be made after approximately one hour. The treated wood should advantageously be protected from rain. Preferably, the insecticide solution should be applied after roofing and framing are in place, before insulation and dry walls are installed.

Referring again to FIG. 1, a trigger pump applicator 10 according to the present invention is also suitable for delivering a liquid fertilizer to a plant. A variety of liquid fertilizers known in the fertilizer art may be used. Use of extended nozzle 30 with the applicator 10 permits fertilizer to be injected below the surface of loose soil, and closer to the root structure of a plant so that nutrients may be absorbed more readily. The extended nozzle 30 must be at least semi-rigid to permit the nozzle 30 to be forcibly inserted into the soil. In cases where the soil is hard or packed, the liquid fertilizer may be readily delivered adjacent to the root structure using the applicator 10 coupled with an extended nozzle 30 by first probing the soil with a sharp, pointed instrument such as a pointed rod or pick.

Preferred embodiments of the present invention have thus been shown and described. It would be apparent to one of ordinary skill in the art, however, that numerous alterations may be made to the embodiments herein disclosed without departing from the spirit or scope of the invention. Therefore, the invention is not to be limited except in accordance with the following claims.

What is claimed is:

1. A hand-held trigger pump insecticide applicator for applying an insecticide solution into holes, cracks or wall voids, the device comprising:

a pump assembly activated with a trigger;

a nipple rotatably coupled to the pump assembly and defining a cylindrical recess of approximately 0.085 inch in diameter, the nipple being rotatable to selectively restrict flow;

a semirigid tubular extended nozzle approximately 6 inches in length and having an outside diameter of approximately 0.085 inch adapted to press-fit into the cylindrical recess of the nipple; and an unpressurized reservoir that threadedly and detachably engages the pump assembly, wherein the reservoir contains a liquid insecticide comprising a 5% to 20% water solution of a disodium octaborate tetrahydrate mixture, the mixture having comprised, before dissolution in water, at least 95% by weight disodium octaborate tetrahydrate, pigment, and an ingredient selected from the group consisting of sucrose octa-acetate and denatonium benzoate.

2. The device according to claim 1, wherein the liquid insecticide solution comprises disodium octaborate tetrahydrate in an amount greater than 5.26 weight percent.

3. A liquid insecticide applicator device suitable for injecting liquid insecticide into a hole or crack, the device comprising a hand-held trigger pump having a single detachable tubular extended nozzle for discharging liquid insecticide;

wherein the trigger pump comprises a pump assembly to which the extended nozzle attaches and an unpressurized reservoir that threadedly and detachably engages the pump assembly; wherein the reservoir contains a liquid insecticide; and wherein the liquid insecticide is a water solution containing solute in an amount between 5 and 20 weight percent, said solute comprising disodium octaborate tetrahydrate in an amount at least 95% by weight, pigment, and an ingredient selected from the group consisting of sucrose octa-acetate and denatonium benzoate.

4. The device according to claim 3, wherein the liquid insecticide solution comprises disodium octaborate tetrahydrate in an amount greater than 5.26 weight percent.

5. A method for injecting a liquid insecticide solution into a hole or void, the method comprising the steps of:

providing a hand-held trigger pump assembly having a trigger and a nipple defining a recess, a semirigid tubular extended nozzle removably press-fit into the recess, and an unpressurized reservoir containing a liquid insecticide solution;

inserting the tubular extended nozzle into the hole or void; and activating the trigger of the trigger pump bottle, thereby causing liquid insecticide to be discharged through the tubular extended nozzle;

wherein the liquid insecticide solution comprises a water solution containing solute in an amount between 5 and 20 weight percent, said solute comprising disodium octaborate tetrahydrate in an amount at least 95% by weight, pigment, and an ingredient selected from the group consisting of sucrose octa-acetate and denatonium benzoate.

6. The method according to claim 5, wherein the liquid insecticide solution comprises disodium octaborate tetrahydrate in an amount greater than 5.26 weight percent.

7. An unpressurized liquid insecticide applicator device suitable for injecting liquid insecticide into holes formed by wood destroying insects in a wood member, the device comprising a hand-held trigger pump having a single detachable tubular extended nozzle for discharging liquid insecticide;

wherein the liquid insecticide is a water solution containing solute in an amount between 5 and 20 weight percent, said solute comprising disodium octaborate tetrahydrate in an amount at least 95% by weight, pigment, and an ingredient selected from the group consisting of sucrose octa-acetate and denatonium benzoate.

8. The device according to claim 7, wherein the liquid insecticide solution comprises disodium octaborate tetrahydrate in an amount greater than 5.26 weight percent.

* * * * *